United States Patent
Wallinger et al.

(10) Patent No.: US 12,030,224 B2
(45) Date of Patent: Jul. 9, 2024

(54) HIGH DYNAMIC TEMPERATURE CONTROL SYSTEM

(71) Applicant: WATLOW ELECTRIC MANUFACTURING COMPANY, St. Louis, MO (US)

(72) Inventors: Martin Wallinger, Abtenau (AT); Gerhard Schefbänker, Scheffau am Tennengebirge (AT); Wolfgang Pöschl, Abtenau (AT); Gernot Antosch, Hallein (AT); Reinhardt Lehnert, Ubstadt-Weiher (DE); Michael Kübler, Untergruppenbach-Oberheinriet (DE); August Burr, Bretzfeld (DE)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 17/682,622

(22) Filed: Feb. 28, 2022

(65) Prior Publication Data
US 2022/0266478 A1 Aug. 25, 2022

Related U.S. Application Data

(63) Continuation of application No. 13/629,999, filed on Sep. 28, 2012, now abandoned.
(Continued)

(51) Int. Cl.
*B29C 33/02* (2006.01)
*H05B 3/28* (2006.01)
(Continued)

(52) U.S. Cl.
CPC .............. *B29C 33/02* (2013.01); *H05B 3/28* (2013.01); *B29C 45/2642* (2013.01);
(Continued)

(58) Field of Classification Search
CPC ..... B29C 45/73; B29C 33/02; B29C 45/2642; B29C 45/7312; B29C 2033/023;
(Continued)

(56) References Cited

U.S. PATENT DOCUMENTS 5,388,803 A * 2/1995 Baumgartner .......... B29C 33/56
264/106
5,897,814 A * 4/1999 Niemeyer ............ B29D 17/005
264/107
(Continued)

*Primary Examiner* — Armand Melendez
(74) *Attorney, Agent, or Firm* — Burris Law, PLLC

(57) ABSTRACT

A molding system is provided, which includes at least one mold part and a heating and cooling module. The at least one mold part defines a mold cavity having an opening. The heating and cooling module is inserted into the opening to close the mold cavity. The heating and cooling module includes a die insert defining a mold surface, a layered heater for heating the mold surface, and a cooling unit for cooling the mold surface. The layered heater is disposed between the die insert and the cooling unit and includes functional layers formed directly on a surface of the cooling unit or a surface of the die insert opposite to the mold surface by using layered or layering processes selected from a group consisting of thick film, thin film, thermal spray and sol-gel processes.

21 Claims, 10 Drawing Sheets

Related U.S. Application Data

(60) Provisional application No. 61/540,704, filed on Sep. 29, 2011.

(51) Int. Cl.
*B29C 45/26* (2006.01)
*B29C 45/27* (2006.01)
*B29C 45/73* (2006.01)

(52) U.S. Cl.
CPC .. *B29C 2045/2746* (2013.01); *B29C 45/7312* (2013.01); *H05B 2203/003* (2013.01)

(58) Field of Classification Search
CPC . B29C 2035/0211; H05B 3/283; H05B 3/286; H05B 3/30; H05B 3/32
USPC .......... 425/547, 406, 470, 182, 181; 249/79, 249/114.1, 111, 134, 182
See application file for complete search history.

(56) References Cited

U.S. PATENT DOCUMENTS

| | | | | |
|---|---|---|---|---|
| 6,222,166 | B1* | 4/2001 | Lin | H05B 3/265 |
| | | | | 219/548 |
| 7,291,004 | B2* | 11/2007 | Kang | B82Y 10/00 |
| 8,574,473 | B2* | 11/2013 | Sun | B29C 45/7312 |
| | | | | 264/45.3 |
| 2001/0003336 | A1 | 6/2001 | Abbott et al. | |
| 2006/0144516 | A1 | 7/2006 | Ricci et al. | |
| 2007/0039943 | A1 | 2/2007 | Burr et al. | |
| 2009/0001066 | A1 | 1/2009 | Pilavdzic et al. | |
| 2010/0159061 | A1* | 6/2010 | Chen | B29C 45/73 |
| | | | | 165/104.19 |
| 2011/0092072 | A1 | 4/2011 | Singh et al. | |
| 2011/0229595 | A1* | 9/2011 | Krommer | B22D 17/2218 |
| | | | | 427/446 |

\* cited by examiner

HIGH DYNAMIC TEMPERATURE CONTROL SYSTEM

CROSS-REFERENCE TO RELATED APPLICATIONS

This application is a continuation of U.S. application Ser. No. 13/629,999 filed Sep. 28, 2012, which claims the benefit of U.S. Provisional Application Ser. No. 61/540,704, filed on Sep. 29, 2011, the contents of which are incorporated herein by reference in their entirety.

FIELD

The present disclosure relates to molding systems, and more particularly, molds or heaters for molding systems.

BACKGROUND

The statements in this section merely provide background information related to the present disclosure and may not constitute prior art.

A molding system for plastic and reinforced plastic generally includes a mold and a heating system to heat the plastic material. The mold defines a mold cavity having a shape corresponding to that of a plastic part to be produced. For some molding processes, fast heating up and cooling of mold surfaces that define a mold cavity is desired. This process, which is known as variothermal molding process, provides amongst others, manufacturing of molding parts with extremely high flow path—wall section ratio, molding parts with functional micro- and nano-structured surfaces, specific activation of crosslink reaction using Duroplast or Elastomere etc.

Heating and cooling of the mold surfaces can be done with e.g. a heat transfer medium which is directed in a plurality of passageways near the cavity surface. The major problems in a typical variothermal molding system using a transfer medium include low dynamic molding cycles, inefficient use of energy, absence of temperature selectivity on the mold surfaces, absence of temperature separation between cavity and rest of the molding tool.

SUMMARY

In one form of the present disclosure, a molding system is provided, which includes at least one mold part and a heating and cooling module. The at least one mold part defines a mold cavity having an opening. The heating and cooling module is inserted into the opening to close the mold cavity. The heating and cooling module includes a die insert defining a mold surface, a layered heater for heating the mold surface, and a cooling unit for cooling the mold surface. The layered heater is disposed between the die insert and the cooling unit and includes functional layers formed directly on a surface of the cooling unit or a surface of the die insert opposite to the mold surface by using layered or layering processes selected from a group consisting of thick film, thin film, thermal spray and sol-gel processes.

In other features, the layered heater is formed on one of the die insert and the cooling unit by thermal spraying. The thermal spraying includes a plurality of layers including a top coat comprising a material having relatively high thermal conductivity. The top coat is machined to a predetermined thickness. The top coat includes a first metallic top coat layer and a second metallic top coat layer. At least one of the first metallic top coat layer and the second metallic top coat layer is a galvanic nickel layer. The die insert or the cooling unit is clamped to the layered heater. The cooling unit includes a plurality of cutout portions on a peripheral surface of the cooling unit. The cooling unit includes a thermal insulation layer on a peripheral surface of the cooling unit. The cooling unit includes a substrate and a plurality of passageways in the substrate. The molding system further includes a thermal insulation layer formed around the cooling unit. The molding system further includes a top coat layer formed on the second dielectric layer, wherein the top coat layer includes a metal. The heating/cooling surface is a surface of the top coat layer.

Further aspects of the present disclosure will be in part apparent and in part pointed out below. It should be understood that various aspects of the disclosure may be implemented individually or in combination with one another. It should also be understood that the detailed description and drawings, while indicating certain exemplary forms of the present disclosure, are intended for purposes of illustration only and should not be construed as limiting the scope of the disclosure.

DRAWINGS

The drawings described herein are for illustration purposes only and are not intended to limit the scope of the present disclosure in any way.

It should be understood that throughout the drawings corresponding reference numerals indicate like or corresponding parts and features.

DETAILED DESCRIPTION

The following description is merely exemplary in nature and is not intended to limit the present disclosure or the disclosure's applications or uses.

First Embodiment

Figure 1:
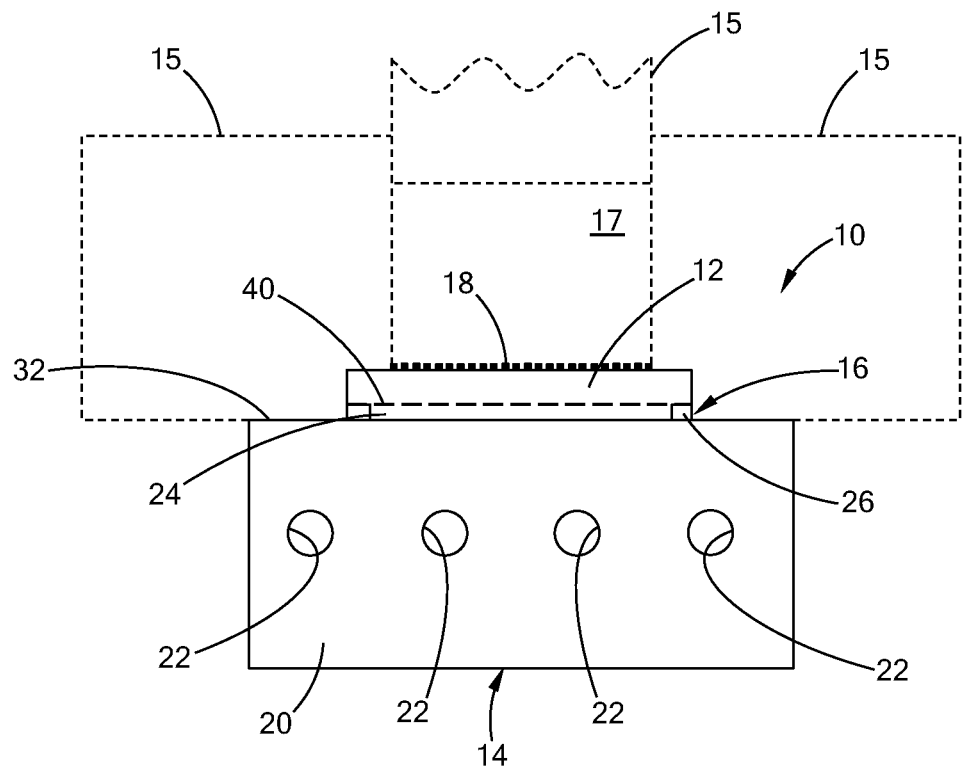
FIG. 1 is a schematic, cross-sectional view of a heating/cooling module for a molding system in accordance with a first embodiment of the present disclosure.

Referring to FIG. 1, a heating/cooling module 10 for a molding system (not shown) according to a first embodiment of the present disclosure is shown. The molding system may be an injection molding system, a system for forming fiber reinforced composites such as resin transfer molding (RTM), reaction injection molding (RIM) or using prepregs with a Duroplast or Thermoplast as matrix and glass fiber, carbon fiber or Aramidfiber for reinforcement, a thermoforming system, an optical disc molding system or any molding system known in the art that utilizes a heated mold. The heating/cooling module 10 includes a die insert 12, a cooling unit 14, and a layered heater 16 disposed between the die insert 12, and the cooling unit 14.

The die insert 12 is used for shape-forming an article, such as a plastic part or an optical part. When the molding system is an optical disc molding system, the die insert 12 may be a stamper for molding an optical disc. The die insert 12 includes a mold surface 18, and cooperates with a plurality of mode parts 15 to define a mold cavity 17. The mold surface 18 of the die insert 12 is in direct contact with the molten resin received in the mold cavity 17. While the mold surface 18 is shown to be a flat surface, the mold surface 18 may have varied shape depending on applications. The mold surface 18 may be macro surface structures, micro surface structures, nano surface structures, or polished surfaces, among others. The heating/cooling module 10 provides heating and cooling and functions as a tempering unit for adjusting the temperature of the mold surface 18 of the die insert 12.

The cooling unit 14, which may take the form of a cooling block, includes a substrate 20 and a plurality of passageways 22 for directing heat transfer medium, such as water, oil, and brine, therein. The heat transfer medium may be in liquid, vapor or gaseous form. Phase change of heat transfer mediums, such as $CO_2$, fluorocarbon compounds or steam (evaporation of fogging systems), and peltier elements etc., may be used. The cooling unit 14 is used to dissipate heat from the mold cavity 17 through the mold surface 18 of the die insert 12. The passageways 22 may be formed by drilling, deep-hole drilling, selective laser sintering, soldering etc.

Figure 2:
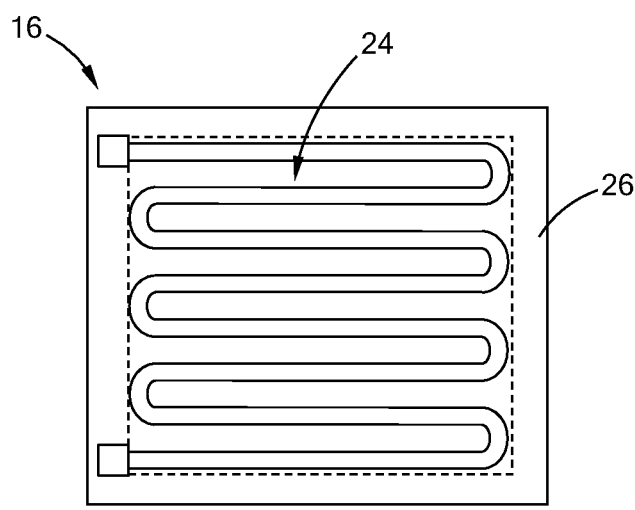
FIG. 2 is a top perspective view of a layered heater of FIG. 1.

Referring to FIG. 2, the layered heater 16 may be formed on the cooling unit 14 by layered processes. As used herein, the term "layered heater" should be construed to include heaters that comprise at least one functional layer (e.g., bond coat layer, dielectric layer, resistive heating layer, protective layer, over coat layer, among others), wherein the layer is formed through application or accumulation of a material to a substrate or another layer using processes associated with thick film, thin film, thermal spraying, or sol-gel, among others. These processes are also referred to as "layered processes," "layering processes," or "layered heater processes." The primary difference between these types of layered heaters is the method in which the layers are formed. For example, the layers for thick film heaters are typically formed using processes such as screen printing, decal application, or film printing heads, among others. The layers for thin film heaters are typically formed using deposition processes such as ion plating, sputtering, chemical vapor deposition (CVD), and physical vapor deposition (PVD), among others. Yet another series of processes distinct from thin and thick film techniques are those known as thermal spraying processes, which may include by way of example flame spraying, plasma spraying, wire arc spraying, and HVOF (High Velocity Oxygen Fuel), among others.

For example, the layered heater 16 of the heating/cooling module 10 may be formed by thermal spraying. The layered heater 16 may include a resistive heating layer 28, which may be configured to form a serpentine shape, a spiral shape or any other shape. The layered heater 16 defines a central active heating region 24 where the resistive heating layer 28 is formed and a peripheral non-active heating region 26 where the resistive heating layer 28 is not formed. As shown in FIG. 1, the area of the central active heating region 24 is at least as large as the area of the mold surface 18 in order to provide uniform heating on the mold surface 18.

Figure 3:
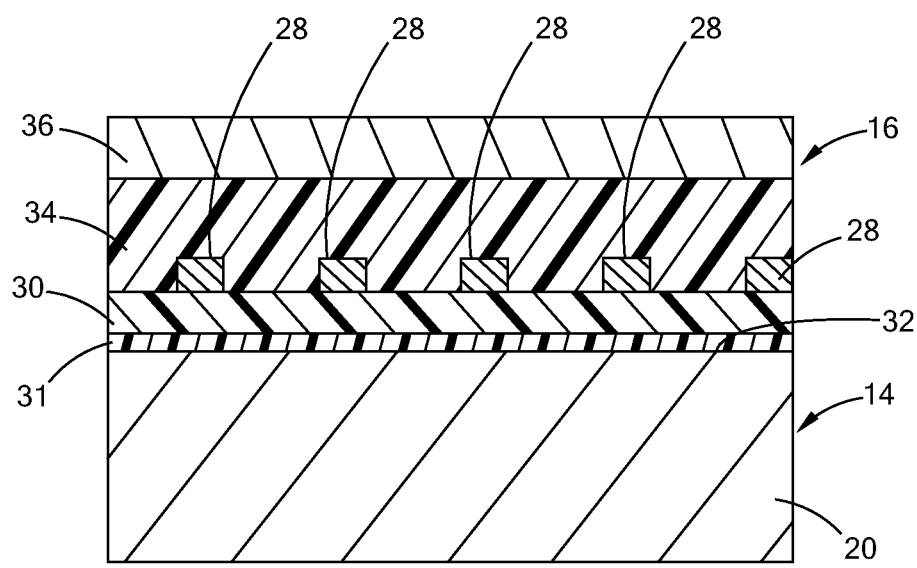
FIG. 3 is a schematic, cross-sectional view of a cooling unit with a layered heater formed thereon.

Referring to FIG. 3, the layered heater 16 is formed directly on a substrate 20 of the cooling unit 20 by layered processes. The layered heater 16 may optionally include a bond coat layer 31 deposited on a top surface 32 of the substrate 20 by thermal spraying and a first dielectric layer 30 deposited on the bond coat layer 31 by thermal spraying. It is understood that the bond coat layer 31 may be eliminated and the first dielectric layer 30 may be formed directly on the substrate 20 of the cooling unit 20 by layered processes such as thermal spraying without departing from the scope of the present disclosure. The resistive heating layer 28, which includes electrically conductive material, may be formed on the first dielectric layer 30 by layered process, such as thermal spraying. The resistive heating layer 28 may be formed by thermally spraying a resistive material on the entire top surface of the first dielectric layer 30, followed by etching or laser cutting the resistive material into a predetermined shape (such as spiral or serpentine). A second dielectric layer 34, which functions as a protective layer, is deposited on the first dielectric layer 30 and the resistive heating layer 28 by thermal spraying.

Optionally, a top coat layer 36 may be formed on the second dielectric layer 34 by thermal spraying. The top coat layer 36 may include metals having good thermal conductivity to facilitate heat transfer from the resistive heating layer 28 to the mold surface 18 or from the mold surface 18 to the cooling unit 14. A multilayer construction with several heating layers separated with several dielectric layers is possible as well. The termination and accordingly the connection of the different layers may be formed by vertical interconnect access (VIAs). Vertical interconnect access is a vertical electrical connection between different layers of conductors commonly seen in printed circuit boards. Vias are pads with plated holes that provide electrical connections between conductors on different layers of the board. The holes are made conductive by electroplating, or are filled with annular rings or small rivets. To form the top coat layer 36, excessive material for the top coat layer 36 may be deposited on the second dielectric layer 34. Thereafter, the top coat layer 36 is machined to the predetermined size/ thickness, for example, by grinding and polishing, among others.

After the layered heater 16 is formed on the top surface 32 of the cooling unit 14, the integrated layered heater 16 and the cooling unit 14 is connected to the die insert 12 by any conventional joining methods, such as clamping, physical bonding, or chemical bonding. As shown in FIG. 1, a joining interface 40 is disposed between the layered heater 16 and the die insert 12. The joining interface 40 may be formed by mechanical clamping, including but not limited to, the use of screws, a holder, closing force, magnetic force, vacuum, or spring force, among others. The joining interface 40 may be formed by physical or chemical bonding, including but not limited to, soldering, glue, welding, thermal spraying, bonding, laser-welding. Joining the die insert 12 and the integrated layered heater 16 and the cooling unit 14 by clamping or physical or chemical bonding ensures high heat transfer, uniform heat transfer, and uniform mechanical transmission between the die insert 12 and the integrated layered heater 16 and cooling unit 14.

While the top surface 32 of the cooling unit 14 is shown to be a flat surface, it is understood and appreciated that the top surface 32 may have a three-dimensional configuration.

Second Embodiment

Figure 4:
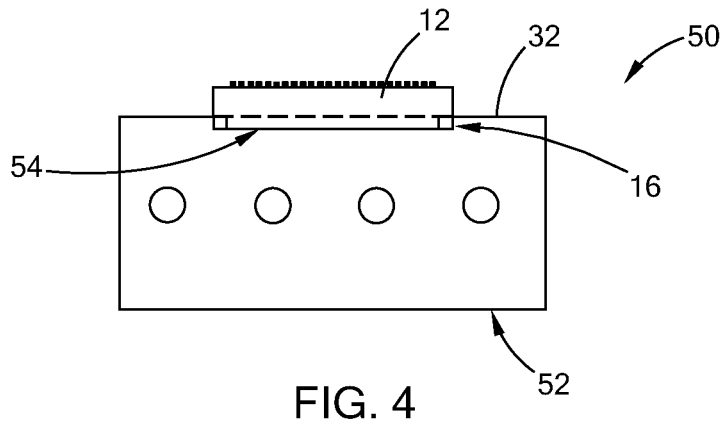
FIG. 4 is a schematic, cross-sectional view of a heating/cooling module in accordance with a second embodiment of the present disclosure.

Referring to FIG. 4, a heating/cooling module 50 in accordance with a second embodiment of the present disclosure includes a die insert 12, a cooling unit 52 and a layered heater 16 provided therebetween. The layered heater 16 of this embodiment is provided in a recessed portion 54 of the cooling unit 52. To form the layered heater 16 on the cooling unit 52, the recessed portion 54 is first formed, for example, by milling or etching, among others. The recessed portion 54 has a size equal to that of the layered heater 16 to be formed. Next, the materials that form the different functional layers of the layered heater 16 are deposited in the recessed portion 54, for example, by thermal spraying. The layered heater 16 in the present embodiment has a structure similar to that of the first embodiment. Therefore, the different function layers may include the bond coat layer 31, the first dielectric layer 30, the resistive heating layer 28, the second dielectric layer 34, and a top coat layer 36, as previously described. These layers are clearly shown in FIG. 3 and are not shown in FIG. 4 for clarify. After the layered heater 16 is deposited in the recessed portion 54, the top coat layer 30 of the layered heater 16 may be machined to make it flush with the top surface 32 of the cooling unit 52. The integrated cooling unit 52 and the layered heater 16 are connected to the die insert 12 by clamping, physical bonding or chemical bonding, as previously described. Similarly, the area of the central active-heating region of the layered heater 16 is approximately the same as the mold surface 18 of the die insert 12 to provide uniform heating on the mold surface 18.

Third Embodiment

Figure 5:
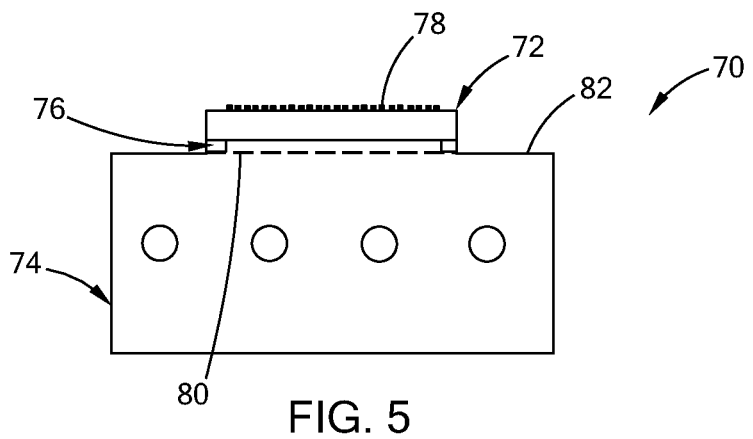
FIG. 5 is a schematic, cross-sectional view of a heating/cooling module in accordance with a third embodiment of the present disclosure.

Referring to FIG. 5, a heating/cooling module 70 in accordance with a third embodiment of the present disclosure includes a die insert 72, a cooling unit 74 and a layered heater 76 therebetween. The die insert 72 defines a mold surface 78. The layered heater 74 is deposited directly on the die insert 72 on a surface opposite to the mold surface 78. The layered heater 74 has a structure similar to the layered heater 16 in the first and second embodiments and may be formed by thermal spraying. Similarly, the integrated layered heater 76 and the die insert 72 are connected to the cooling unit 74 by clamping, physical bonding or chemical joining as previously described. A joining interface 80 is formed between the layered heater 76 and a top surface 82 of the cooling unit 74.

Fourth Embodiment

Figure 6:
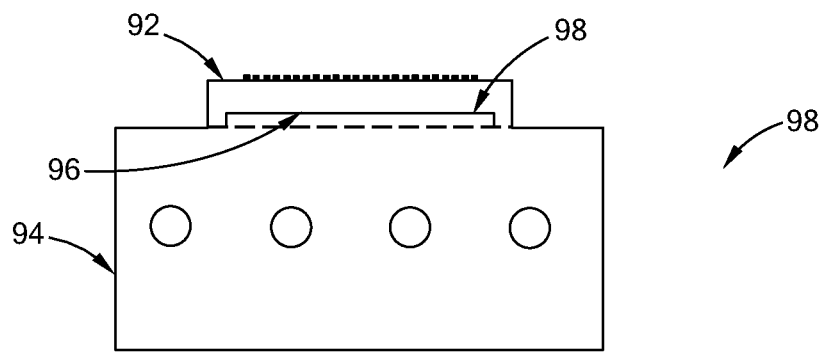
FIG. 6 is a schematic, cross-sectional view of a heating/cooling module in accordance with a fourth embodiment of the present disclosure.

Referring to FIG. 6, a heating/cooling module 90 in accordance with a fourth embodiment of the present disclosure includes a die insert 92, a cooling unit 94, and a layered heater 96 therebetween. This embodiment differs from the third embodiment only in that the layered heater 96 is deposited in a recessed portion 98 of the die insert 92. The method of forming the layered heater 96 in the recessed portion 98 of the die insert 92 is similar to the method of forming the layered heater 16 in the recessed portion 54 of the cooling unit 52 in the second embodiment. Therefore, the description thereof is omitted for clarity.

Fifth Embodiment

Figure 7:
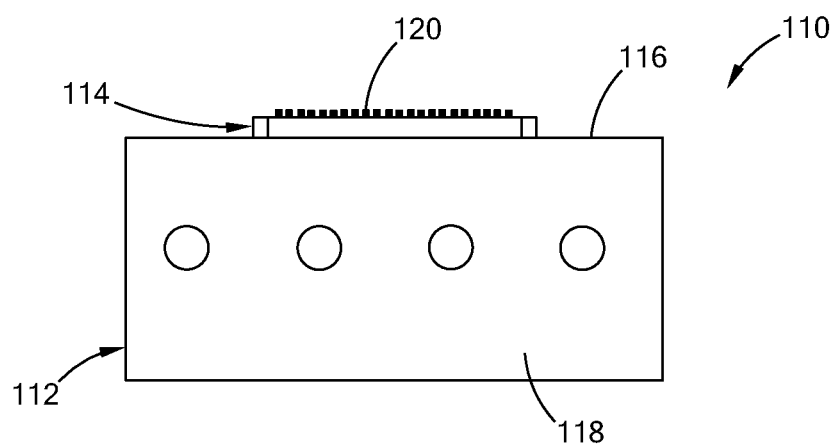
FIG. 7 is a schematic, cross-sectional view of a heating/cooling module in accordance with a fifth embodiment of the present disclosure.

Referring to FIG. 7, a heating/cooling module 110 in accordance with a fifth embodiment of the present disclosure includes a cooling unit 112 and a layered heater 114. The layered heater 114 is deposited on a top surface 116 of a substrate 118 of the cooling unit 112 by thermal spraying. The layered heater 114 is deposited by a method similar to that described in the first embodiment. The layered heater 114 has a top surface, which defines the mold surface 120. Therefore, the layered heater 114 also functions as a die insert. The layered heater 114 is directly deposited on the cooling unit 112. No clamping or joining interface is formed in the heating/cooling module 110.

Sixth Embodiment

Figure 8:
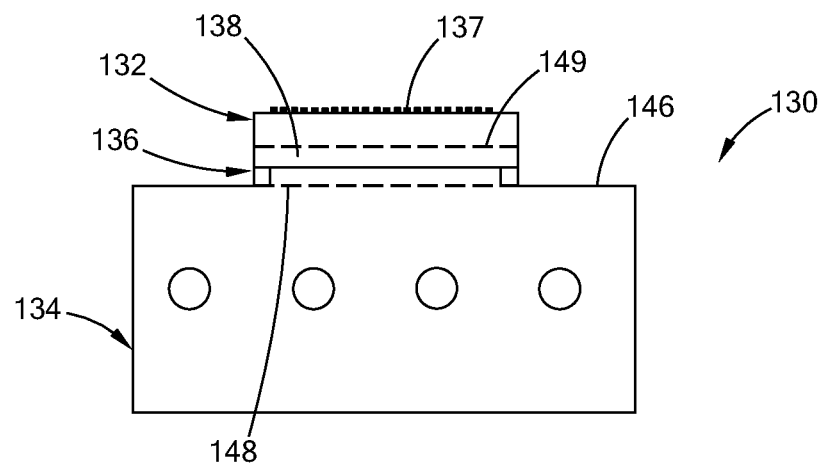
FIG. 8 is a schematic, cross-sectional view of a heating/cooling module in accordance with a sixth embodiment of the present disclosure.
Figure 9:
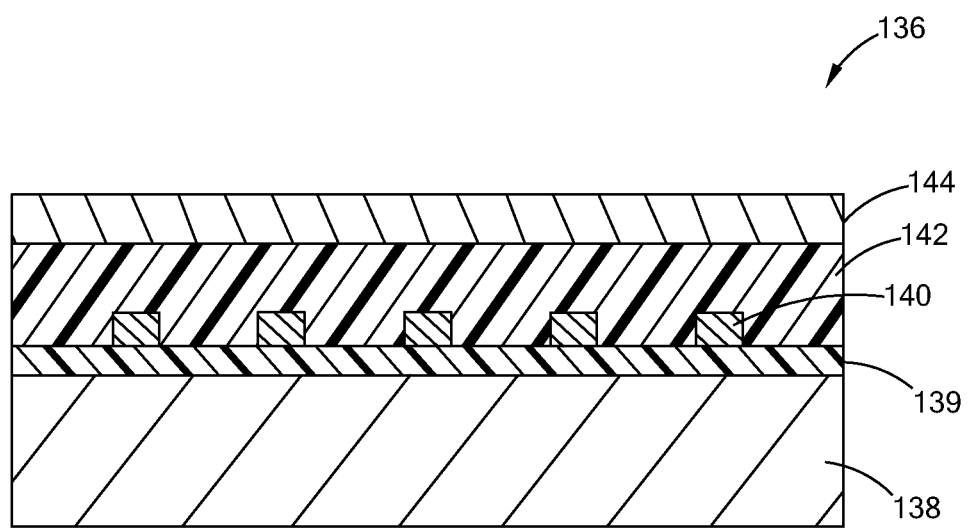
FIG. 9 is a schematic, cross-sectional view of a layered heater of FIG. 8.

Referring to FIG. 8, a heating/cooling module 130 in accordance with a sixth embodiment of the present disclosure includes a die insert 132, a cooling block 134, and a layered heater 136. The die insert 132 includes a mold surface 137. The die insert 132, the cooling unit 134, and the layered heater 136 are formed separately. As clearly shown in FIG. 9, the layered heater 136 includes a substrate 138, a first dielectric layer 139, a resistive heating layer 140, a second dielectric layer 142. Optionally, a top coat layer 144 may be formed on the second dielectric layer 139. These layers 139, 140, 142, 144 may be deposited, for example, by thermal spraying. The layered heater 136 is connected to a top surface 146 of the cooling unit 134 by clamping, physical bonding, or chemical bonding as previously described. The substrate 138 of the layered heater 136 is disposed proximate the die insert 132. A first joining interface 148 is formed between the layered heater 136 and the cooling unit 134. The die insert 132 is connected to the layered heater 136 by clamping, physical bonding, or chemical bonding as previously described. A second joining interface 149 is formed between the die insert 132 and the layered heater 136, particularly, the substrate 138 of the layered heater 136.

While not shown in the drawings, the layered heater 136 may be oriented so that the substrate 138 of the layered heater 136 is disposed proximate the cooling unit 134.

Seventh Embodiment

Figure 10:
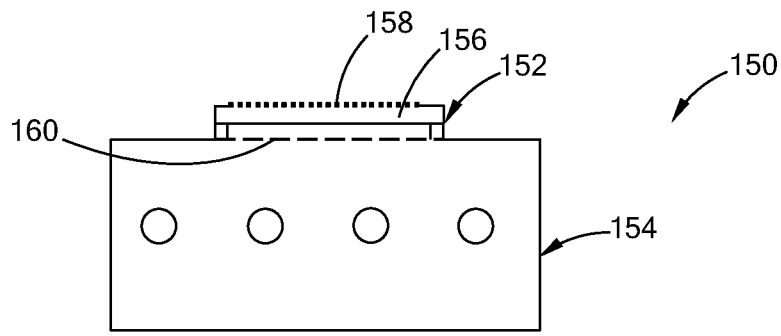
FIG. 10 is a schematic, cross-sectional view of a heating/cooling module in accordance with a seventh embodiment of the present disclosure.

Referring to FIG. 10, a heating/cooling module 150 in accordance with a seventh embodiment of the present disclosure includes a layered heater 152 and a cooling unit 154. The layered heater 152 is similar to the layered heater 136 of the sixth embodiment, and is formed separately from the cooling unit 154. The layered heater 152 includes a substrate 156 and a plurality of functional layers (not shown) deposited thereon. The plurality of functional layers may include dielectric layers, and a resistive heating layer, which are deposited on the substrate 156 by thermal spraying. The substrate 156 of the layered heater 152 includes a mold surface 158. Therefore, the layered heater 152 functions as both a heater and a die insert. The layered heater 152 is connected to the cooling unit 154 by clamping, physical bonding or chemical bonding as previously described. A joining interface 160 is formed between the layered heater 152 and the cooling unit 154.

Eighth Embodiment

Figure 11:
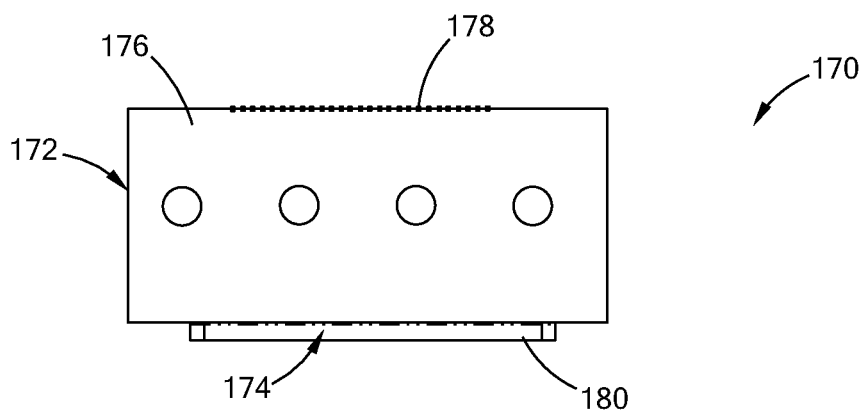
FIG. 11 is a schematic, cross-sectional view of a heating/cooling module in accordance with an eight embodiment of the present disclosure.

Referring to FIG. 11, a heating/cooling module 170 in accordance with an eight embodiment of the present disclosure includes a cooling unit 172 and a layered heater 174. The cooling unit 172 includes a substrate 176 which defines a mold surface 178. The layered heater 174 is a separate component from the cooling unit 172 and includes a substrate 180 and a plurality of functional layers deposited on the substrate 180 by thermal spraying. The layered heater 174 has a structure similar to the layered heater 136 of FIG. 9. The layered heater 174 is connected to the cooling unit 172 at a side distal of the mold surface 178 by clamping, physical bonding or chemical bonding as previously described. The layered heater 174 conducts heat to the mold surface 178 through the substrate 172 of the cooling unit 172.

It is understood that the layered heater 174 can be directly deposited on the cooling unit 172 at the side distal of the mold surface 178 to form the heating/cooling module 170. Therefore, the cooling unit 172 provides both heating and cooling and is also used as a die insert.

Ninth Embodiment

Figure 12:
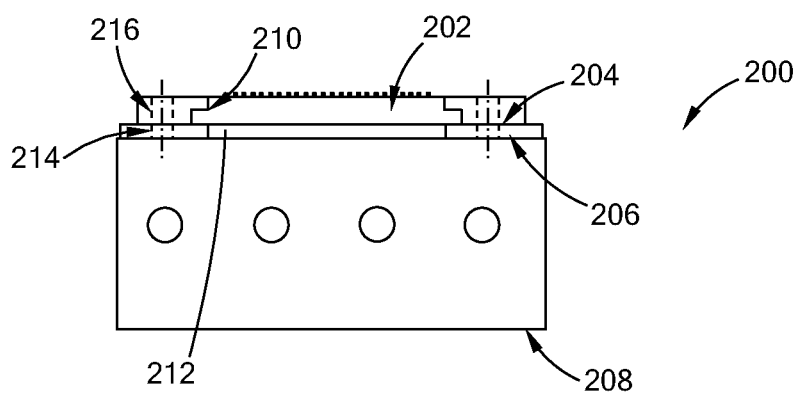
FIG. 12 is a schematic, cross-sectional view of a heating/cooling module in accordance with a ninth embodiment of the present disclosure.

Referring to FIG. 12, a heating/cooling module 200 in accordance with a ninth embodiment of the present disclosure includes a die insert 202, a die insert holder 204, a layered heater 206, and a cooling unit 208. The layered heater 206 is directly deposited on a top surface of the cooling unit 208. The die insert holder 204 defines an opening 210 for receiving the die insert 202 therein. The layered heater 204 includes a central active heating region 212 and a peripheral non-active heating region 214. The area of peripheral non-active heating region 214 is relatively larger than that in any of the previous embodiments so as to provide sufficient area for clamping. Screw holes 216 may be formed in the peripheral non-active heating region 214, and are aligned with screw holes 216 of the die insert holder 204. Screws (not shown) may be inserted into the screw holes 216 to connect the die insert holder 204 to the integrated layered heater 206 and the cooling unit 208. The die insert 202 is joined to the central active-heating region 212 of the layered heater 206 by clamping, physical bonding, or chemical bonding as previously described.

Tenth Embodiment

Figure 13:
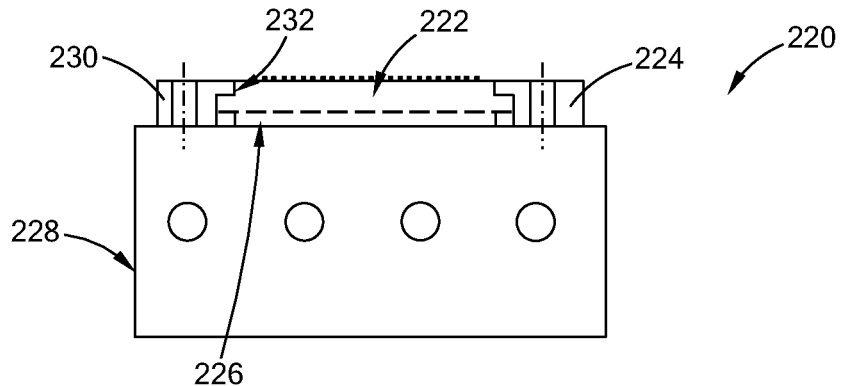
FIG. 13 is a schematic, cross-sectional view of a heating/cooling module in accordance with a tenth embodiment of the present disclosure.

Referring to FIG. 13, a heating/cooling module 220 in accordance with a tenth embodiment of the present disclosure includes a die insert 222, a die insert holder 224, a layered heater 226, and a cooling unit 228. The die insert holder 224 is connected to the cooling unit 228 by screws 230. The die insert holder 224 defines an opening 232 for receiving the die insert 222 and the layered heater 226 therein. The layered heater 226 is deposited on the cooling unit 228 by thermal spraying. The layered heater 226 is connected to the die insert 222 by clamping, physical bonding, or chemical bonding as previously described.

Eleventh Embodiment

Figure 14:
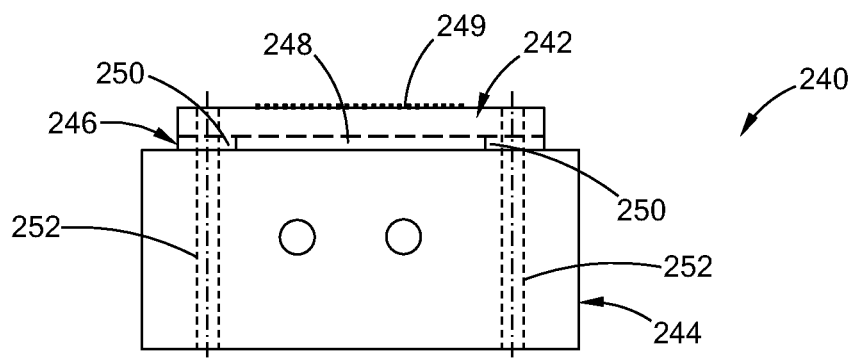
FIG. 14 is a schematic, cross-sectional view of a heating/cooling module in accordance with an eleventh embodiment of the present disclosure.

Referring to FIG. 14, a heating/cooling module 240 in accordance with an eleventh embodiment of the present disclosure includes a die insert 242, a cooling unit 244, and a layered heater 246 thermal-sprayed on the cooling unit 244. The die insert 242 includes a central portion 248 defining a mold surface 249 and a peripheral portion 250 surrounding the central portion 248. Screw holes 252 are formed in the cooling unit 244, a peripheral non-active heating region 252 of the layered heater 246, and the peripheral portion 250 of the die insert 242. Therefore, the die insert 242 and the integrated cooling unit 244 and the layered heater 246 can be connected by inserting screws into the screw holes 252. Additionally, the die insert 242 is connected to the layered heater 246 by clamping, physical bonding or chemical bonding as previously described.

Twelfth Embodiment

Figure 15:
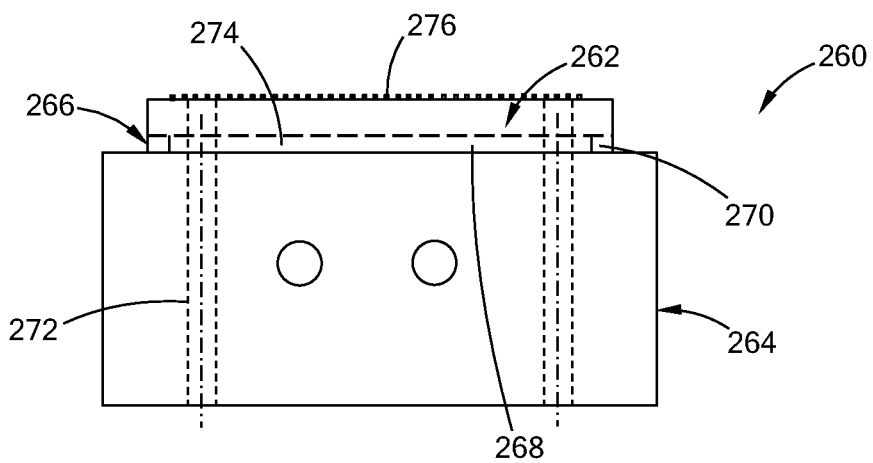
FIG. 15 is a schematic, cross-sectional view of a heating/cooling module in accordance with a twelfth embodiment of the present disclosure.

Referring to FIG. 15, a heating/cooling module 260 in accordance with a twelfth embodiment of the present disclosure includes a die insert 262, a cooling unit 264, and a layered heater 266 thermal-sprayed on the cooling unit. The layered heater 266 includes a central active-heating region 268 and a peripheral non-active heating region 270. Screw holes 272 are formed in the cooling unit 272, the central active-heating region 274 of the layered heater 266, and a portion of the die insert 262 immediately below the mold surface 276. The die insert 262 is secured to the integrated layered heater 266 and the cooling unit 264 by both screwing and one of clamping, physical bonding or chemical bonding.

Figure 16:
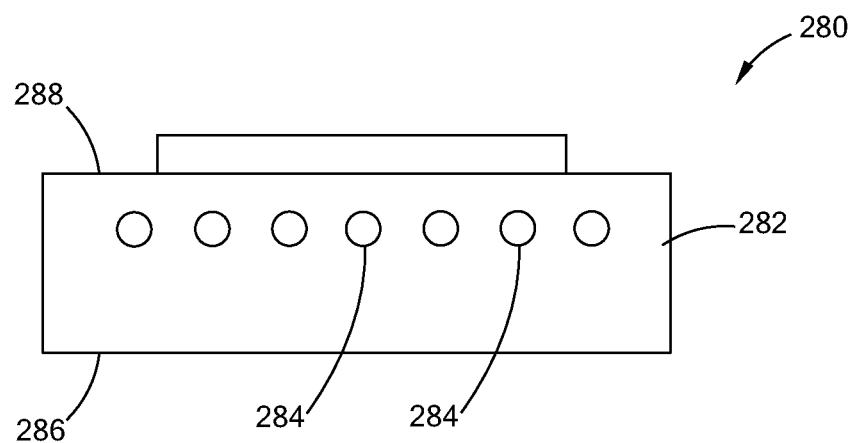
FIG. 16 is a schematic, cross-sectional view of a variant of a cooling unit in accordance with the teachings of the present disclosure.

Referring to FIG. 16, a cooling unit 280 according to a variant of the present disclosure includes a substrate 282, a plurality of passageways 284 formed in the substrate 282, and a thermal insulation layer 286. A layered heater, a die insert, or their combination in any form as described in any of the first to twelfth embodiment is formed on a top surface 288 of the substrate 282. The thermal insulation layer 286 is provided between the substrate 282 of the cooling unit 280 and adjacent components (not shown) of the molding system. The thermal insulation layer 286 blocks heat transfer between the cooling unit 282 and the adjacent components to increase the energy efficiency or the cooling rate. The thermal insulation layer 286 may include a material having poor heat conductivity. The cooling unit 280 can be used in any of the first to twelfth embodiments.

Figure 17:
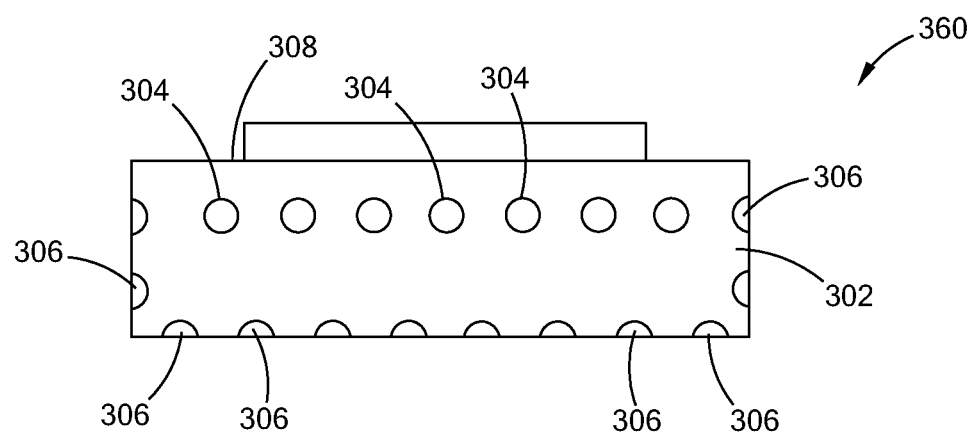
FIG. 17 is a schematic, cross-sectional view of another variant of a cooling unit in accordance with the teachings of the present disclosure.

Referring to FIG. 17, a cooling unit 300 according to another variant of the present disclosure includes a substrate 302, a plurality of passageways 304 formed in the substrate 282, and a plurality of cutout portions 306 along the peripheral surfaces of the substrate 302 except the top surface 308. A layered heater, a die insert, or their combination in any form as described in any of the first to twelfth embodiment is formed on the top surface 308 of the substrate 302. The cutout portions 306 reduce the contact area between the substrate 302 of the cooling unit 300 and adjacent components (not shown) of the molding system, thereby reducing heat transfer therebetween. Moreover, air gaps formed in the cutout portions 306 also help reduce heat transfer between the cooling unit 300 and the adjacent components. The cooling unit 300 can be used in any of the first to twelfth embodiments.

Figure 18:
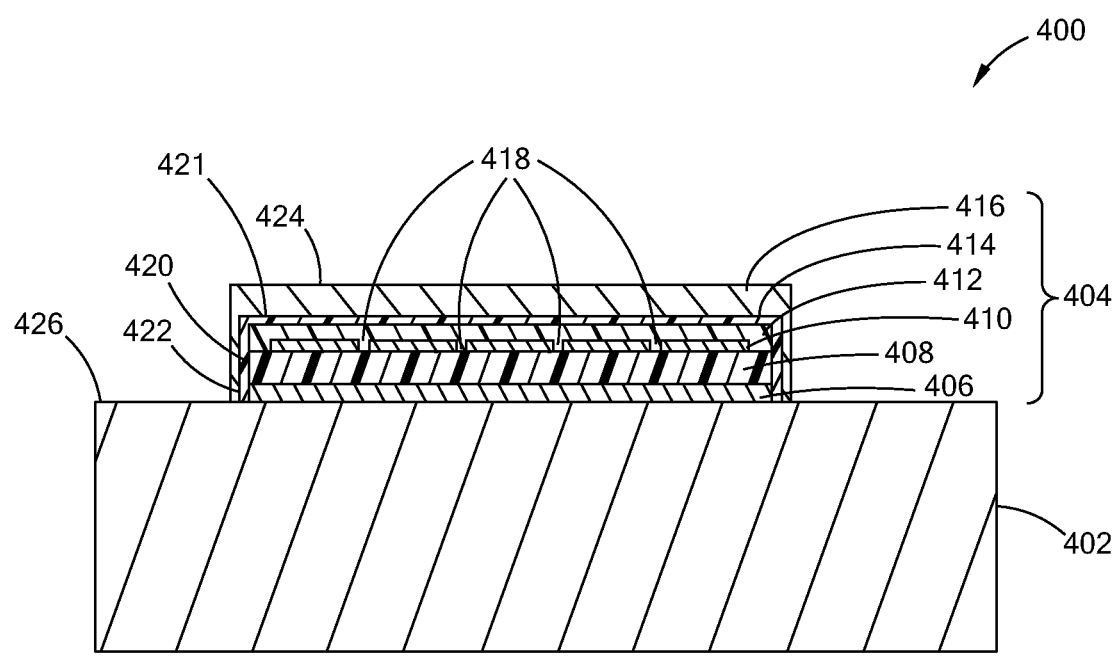
FIG. 18 is a schematic, cross-sectional view of a variant of a heater in accordance with the teachings of the present disclosure.

Referring to FIG. 18, a layered heater 400 according to a variant of the present disclosure is shown. The layered heater 400 may include a substrate 402 and a plurality of functional layers 404 disposed on the substrate 402 by layered processes. The plurality of functional layers 404 include an adhesion layer 406, a base dielectric layer 408, a heating layer 410, a top dielectric layer 412, a first metallic top coat layer 414, and a second metallic top coat layer 416.

The adhesion layer 406 is disposed on the substrate 402. The adhesion layer 406 contacts the substrate 402 and may comprise a material to improve adhesion to the substrate 402. The adhesion layer 406 may be corrosion-resistant to protect the substrate 402 against corrosion.

The base dielectric layer 408 is formed on the adhesion layer 406, for example, by thermal-spraying. The heating layer 410 is disposed on the base dielectric layer 408. The heating layer 410 may be formed by thermal-spraying a heat-resistive material on the base dielectric layer 408, followed by laser-etching the heat-resistive material into a predetermined pattern. One or more grooves 418 may be formed in the heating layer 410. The top dielectric layer 412 is disposed on the heating layer 410 and in the grooves 418, for example, by thermal-spraying.

The first metallic top coat layer 414 is disposed on the top dielectric layer 412. The first metallic top coat layer 414 may be an electrically conductive layer and also applied on the side surfaces 420 of the adhesion layer 406, the base dielectric layer 408, and the top dielectric layer 412. Therefore, the first metallic top coat layer 414 and the substrate 402 enclose the adhesion layer 406, the base dielectric layer 408, the heating layer 410, and the top dielectric layer 412 therein. The first metallic top coat layer 414 may be formed by, for example, thermal spraying, sputtering, coating, thin film process, or thick film screen printing, among others. For example only, the first metallic top coat layer 414 may have a thickness of approximately 100 µm.

The second metallic top coat layer 416 is disposed over the first metallic top coat layer 414 and may be a galvanic nickel layer. The second metallic top coat layer 416 may be formed by thermal spraying, selective laser sintering, soldering, galvanic processing or thick film screen printing, among others. The second metallic top coat layer 412 has a thickness greater than the thickness of the first metallic top coat layer 410. To form the second metallic top coat layer 416, excessive material for the second metallic top coat layer 416 may be deposited on a top surface 421 and side surfaces 422 of the first metallic top coat layer 414. For example only, the second metallic top coat layer 416 may be deposited to have a thickness of approximately 100 µm to 5 mm. Thereafter, the second metallic top coat layer 416 is machined to a predetermined size/thickness, for example, by grinding and polishing, among others.

The first metallic top coat layer 414 is deposited if the second metallic top coat layer 416 is applied by an electrochemical process like electroplating. The first metallic top coat layer 414 forms an electrically conductive layer to facilitate forming the second metallic top coat layer 416 by the electrochemical galvanic process. If the second metallic top coat layer 416 is formed by processes other than the electrochemical process, the first metallic top coat layer 414 can be eliminated. As previously described, the second metallic top coat layer 416 (and optionally the first metallic top coat layer 414) improves heat transfer between the layered heater 400 and the mold insert (not shown) that is disposed adjacent to the layered heater 400. The layered heater 400 may be a separate component from a cooling unit (not shown) or a die insert (not shown) and may be connected to the cooling unit and/or the die insert in any form as described in any of the first to twelfth embodiments. The layered heater 400 may be connected to the cooling unit and/or the die insert by clamping, physical bonding or chemical bonding as described in the first embodiment.

Alternatively, the substrate 402 of the layered heater 400 may be a part of the cooling unit, for example, a cooling block of the cooling unit. Therefore, the layered heater 404 is deposited directly on the cooling unit by firstly depositing the adhesion layer 406 on the substrate 402. The remaining layers of the functional layers 404 are deposited on the adhesion layer 406 by layered processes as previously described to form an integrated layered heater and cooling unit. Optionally, the top surface 424 of the second metallic coat layer 416 may be configured as a mold surface for contacting the resin. Therefore, the layered heater 400 functions as a heater, a cooling unit, and a die insert. While the substrate 402 is shown to have a flat top surface 426 on which the layered heater 400 is formed, it is understood and appreciated that the top surface 426 of the substrate 402 may have a three-dimensional configuration.

Figure 19:
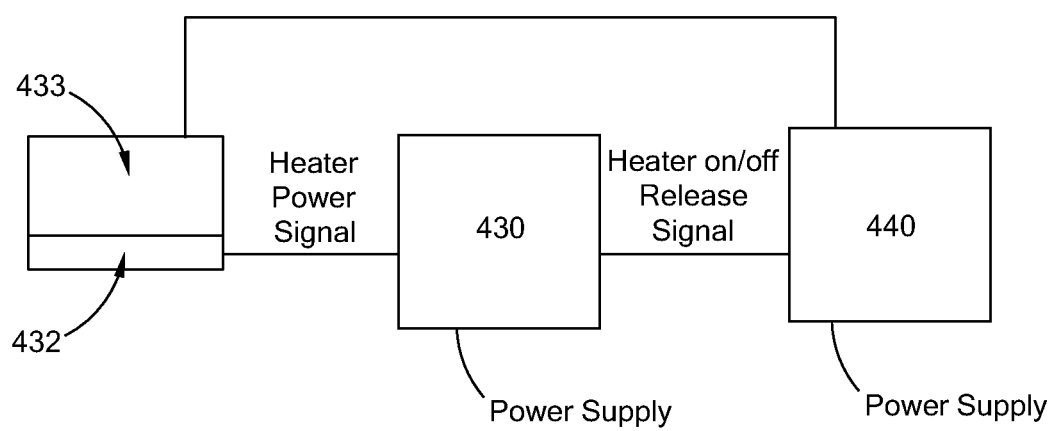
FIG. 19 is a schematic view of a system for controlling temperature of a thermally sprayed heater using two-controller and constructed in accordance with the principles of the present disclosure.

Referring now to FIG. 19, another form a method of controlling temperature of a thermally sprayed heater is illustrated. According to this method, at least two controllers are employed, a first controller 430 for controlling and limiting temperature of a heating layer 432 of the thermally sprayed heater 10, and a second controller 440 for controlling a medium 433 proximate heating layer 432. The first controller 430, in one form, is a two-wire controller, and the heating layer 432 of the thermally sprayed heater 10 has sufficient TCR (temperature coefficient of resistance) characteristics to function as a heating element and a temperature sensor. Such a two-wire controller for use with layered heaters is illustrated and described in U.S. Pat. No. 7,196,295, which is commonly assigned with the present application and the contents of which are incorporated herein by reference in their entirety.

For controlling the medium temperature, a number of types of controllers may be employed, and the medium temperature may be detected with a discrete temperature sensor (not shown) such as a thermocouple, RTD, or thermistor, by way of example.

The first two-wire controller is used for detecting the heating layer temperature, wherein the layered heater comprises a resistive heating layer having sufficient TCR characteristics to function as a heating element and a temperature sensor. The second controller with a discrete temperature sensor is positioned near a heating target and is in communications with the first two-wire controller, wherein the second controller normally controls a temperature of the heating target with the discrete temperature sensor, and in the event of a rapid over-temperature condition, such as with a low mass heating target, the over-temperature condition is detected by the first two-wire controller, and the first two-wire controller communicates with the second controller to prevent overheating.

In one scenario, the actual heating layer temperature is less than a set point temperature of the two-wire controller 430. The heater power signal is switched on and off by an algorithm within the second controller 440. (e.g., a heater on/off release signal). In another scenario, the actual heating layer temperature is greater than a set point of the two-wire controller 430 in order to reduce the risk of an overtemperature condition. In this mode, the heater on/off release signal of the second controller 440 is communicated to the first controller 430 such that no power is provided to the heater when an off release signal is received by the two-wire controller 430.

In another form of the present disclosure, a "flicker rate" of a thermally sprayed heater is controlled using a DC power supply. Generally, flicker is defined as the variations in light intensity from artificial light sources (e.g., incandescent, fluorescent, LED, etc.) caused by changes in source voltage. The amount of flicker will depend on the type of light source and the severity of the voltage change. For resistive load switching, voltage changes are caused by the source impedance and the amount of load switched. The higher the source impedance and the greater the load, the greater the voltage change. Flicker is also time dependent, and there are several standards that define the amount of flicker allowed.

One method to avoid flicker is to use a DC power source for supplying the heater and to control the heater by increasing and decreasing DC voltage levels, and not by switching to an AC signal. Generally, a DC power source cannot be used with thick film heaters since these heaters use conductive paste systems with silver content. Silver in combination with DC causes the silver to migrate and form "whiskers," which can cause electrical shorting. Therefore, with the use of thermal spraying, a DC power source can be employed to address the flicker issue.

The present disclosure provides a heating/cooling module which is an integrated structure of a layered heater, a cooling unit, and a die insert that forms a mold surface. With the integrated structure, heat transfer from the layered heater to the mold surface, or from the mold surface to the cooling unit can be more rapidly conducted. Heat is not unnecessarily conducted between the heat source (or cooling source) and the molding tools that are not in proximity of the molding surface, as opposed to a prior art molding system. Therefore, a rapid thermal response for the variothermal molding process can be achieved, and the cycle time in forming the molding parts is reduced. Alternatively, a surface of the layered heater or the cooling unit may be used as the molding surface to eliminate the die insert, thereby reducing the number of components in the molding system. A molding system with the heating/cooling module of the present disclosure has a more compact structure than a prior art molding system due to the compactness of the layered heater.

While the embodiments of the present disclosure have been described in connection with plastic molding processes, it is understood and appreciated that the integrated heating/cooling module may find applications in fields other than molding processes. For example, the integrated heating/cooling module of the present disclosure may be used in electronic industry or wafer producing process where high dynamic temperature control of a target is desired. The mold surface as described in any of the embodiments of the present disclosure may become a heating/cooling surface disposed proximate the target and heat transfer between the target and the layered heater or between the target and the cooling unit is conducted through the heating/cooling surface. Alternatively, when the integrated heating/cooling module is not used to heat resin in a molding system, the die insert can be eliminated and the heating/cooling surface is a surface of the layered heater or the cooling unit of the integrated heating/cooling module. When the heating/cooling surface is a surface of the layered heater, the heating/cooling surface may be a surface of the top overcoat layer that includes metals to facilitate heat transfer between the heating/cooling module and the target. This description is merely exemplary in nature and, thus, variations that do not depart from the gist of the disclosure are intended to be included within the scope of the disclosure. Further areas of applicability of the present disclosure will become apparent from the detailed description provided hereinafter. It should be understood that the description and specific examples, while indicating the preferred embodiments of the invention, are intended for purposes of illustration only and are not intended to limit the scope of this disclosure.

What is claimed is:

1. A molding system comprising:
    at least one mold part defining a mold cavity having an opening;
    a heating and cooling module inserted into the opening to close the opening of the mold cavity, the heating and cooling module comprising
        a die insert defining a mold surface to be in contact with a molten material received in the mold cavity,
        a layered heater for heating the mold surface, and
        a cooling unit for cooling the mold surface,
    wherein an entire area of the mold surface is disposed inside the mold cavity defined by the at least one mold part, such that the mold surface is being in contact with the at least one mold part and an entire portion of the die insert is surrounded by the at least one mold part when the opening of the mold cavity is closed by the heating and cooling module, the entire portion of the die insert being higher than any other part of the heating and cooling module, spaced apart from a top surface of the cooling unit and not in contact with the cooling unit,
    wherein the layered heater is disposed between the die insert and the cooling unit and includes functional layers formed directly on a surface of the cooling unit or a surface of the die insert opposite to the mold surface by using layered or layering processes selected from a group consisting of thick film, thin film, thermal spray and sol-gel processes.

2. The molding system of claim 1, wherein the layered heater is formed on one of the die insert and the cooling unit by thermal spraying.

3. The molding system of claim 1, wherein the layered heater is formed on the die insert by thermal spraying.

4. The molding system of claim 3, wherein the thermal spraying comprises a plurality of layers including a top coat comprising a material having relatively high thermal conductivity.

5. The molding system of claim 4, wherein the top coat is machined to a predetermined thickness.

6. The molding system of claim 1, wherein the die insert is clamped to the layered heater.

7. The molding system of claim 1, wherein the cooling unit is clamped to the layered heater.

8. The molding system of claim 1, wherein the cooling unit includes a plurality of cutout portions on a peripheral surface of the cooling unit.

9. The molding system of claim 1, wherein the cooling unit includes a thermal insulation layer on a peripheral surface of the cooling unit.

10. The molding system of claim 1, wherein the cooling unit includes a substrate and a plurality of passageways in the substrate.

11. The molding system of claim 1 further comprising a thermal insulation layer formed around the cooling unit.

12. The molding system of claim 4, wherein the top coat includes a first metallic top coat layer and a second metallic top coat layer.

13. The molding system of claim 12, wherein at least one of the first metallic top coat layer and the second metallic top coat layer is a galvanic nickel layer.

14. The molding system of claim 1, wherein the layered heater is integrally formed with the cooling unit to form an integrated unit.

15. The molding system of claim 14, wherein the cooling unit includes a substrate and a plurality of passageways in the substrate.

16. The molding system of claim 15, wherein the layered heater is formed on and in contact with the substrate of the cooling unit by layered processes.

17. The molding system of claim 16, wherein the layered heater includes a first dielectric layer disposed on the substrate of the cooling unit, a resistive heating layer disposed on the first dielectric layer, and a second dielectric layer disposed on the resistive heating layer.

18. The molding system of claim 17, further comprising a top coat layer formed on the second dielectric layer, wherein the top coat layer includes a metal.

19. The molding system of claim 18, wherein the top coat layer defines the mold surface.

20. The molding system of claim 1, wherein the top surface of the cooling unit is in contact with the at least one mold part and disposed outside the at least one mold part.

21. The molding system according to claim 1, wherein the layered heater comprises an adhesion layer deposited directly on a top surface of the cooling unit, a dielectric layer on the adhesive layer, a heating layer on the dielectric layer and a top layer on the heating layer.

* * * * *